United States Patent [19]
David et al.

[11] 3,778,550
[45] Dec. 11, 1973

[54] SYSTEM FOR SYNCHRONIZING CLOCK SIGNALS TO INCOMING DATA

[75] Inventors: Guy Albert Jules David, Thiais; Michel Guy Amedee Duquenne, Meudon Bellevue, both of France

[73] Assignee: U.S. Philips Corporation, New York, N.Y.

[22] Filed: July 27, 1971

[21] Appl. No.: 166,480

[30] Foreign Application Priority Data

July 31, 1970 France ............................ 7028316

[52] U.S. Cl. ............................ 178/69.5 R, 328/72
[51] Int. Cl. ............................ H04l 7/00
[58] Field of Search ............................ 178/69.5 R; 179/15 BS; 328/72, 133, 134; 325/321

[56] References Cited

UNITED STATES PATENTS

| | | | |
|---|---|---|---|
| 2,980,858 | 4/1961 | Grondin et al. | 178/69.5 R |
| 3,248,664 | 4/1966 | Krasnick et al. | 178/69.5 R |
| 3,462,551 | 8/1969 | Fong | 178/69.5 R |
| 3,544,717 | 12/1970 | Smith | 178/69.5 R |

*Primary Examiner*—Robert L. Richardson
*Attorney*—Frank R. Trifari

[57] ABSTRACT

A synchronizing device locally reproducing with very high precision the phase of a clock signal at the rhythm of which data are received, comprising two independent control circuits, one for correcting the frequency of the local oscillator, the other for correcting the phase of the local clock signal; in the phase correcting arrangement a device detecting the transition of the incoming data supplies pulses at the zero passages of the digital integrators, which pulses are filtered in a digital filter which produces phase-correction instructions to a correction device.

7 Claims, 7 Drawing Figures

INVENTORS
GUY ALBERT JULES DAVID
MICHEL GUY AMEDEE DUQUENNE
BY
AGENT

INVENTORS
GUY ALBERT JULES DAVID
MICHEL GUY AMEDEE DUQUENNE
BY
AGENT

INVENTORS
GUY ALBERT JULES DAVID
MICHEL GUY AMEDEE DUQUENNE
BY
AGENT

*INVENTORS*
GUY ALBERT JULES DAVID
MICHEL GUY AMEDEE DUQUENNE
*BY*
AGENT

SYSTEM FOR SYNCHRONIZING CLOCK SIGNALS TO INCOMING DATA

The invention relates to a synchronizing device for local high-precision reproduction of the phase of a clock pulse, at the rate of which data are received, said device comprising a high-frequency local oscillator followed by a binary frequency divider supplying the local clock pulse rate and comprising means for correcting the frequency of the local oscillator and the phase of the local clock pulse.

Such a synchronizing device is employed at the receiver end in synchronous data transmission systems, in which it is necessary to strictly synchronize the clock signals of the receiver with the incoming data.

The devices hitherto known for carrying out this synchronization are of two types:

In a first type the frequency of the local oscillator is subjected to the rhythm of the incoming data with the aid of a phase control-loop. The local oscillator may be in the form of a voltage controlled quartz oscillator of the type termed in British literature VCXO or a variable frequency oscillator (termed VFO).

A device of this kind is described, for instance, by Viterbi (Phase-locked loop dynamics in the presence of noise by Fokker blank techniques, December 1963: Proceedings, I.E.E.E.).

Such devices utilizing analogue technology are expensive and critical in setting, They require high-precision phase characteristic filters and in operation deviations due to ageing and temperature fluctuations are unavoidable.

A digital type of this synchronizing device has been described in which the local oscillator frequency is controlled (Synthesis of digital phase-locked loops, Aescon 68 Record, Wallace and Larimore). However, such a device is highly complicated and provides only clock frequencies of a few kHz.

In a second known type of synchronizing devices the zero passages of the incoming data are detected in parallel and the resultant pulses are utilized in a digital phase control for correcting the rhythm obtained at the output of the local oscillator.

Such a device comprising a differentiating circuit is, however, sensitive to noise and in itself not capable of compensating for important frequency drifts of the local oscillator.

It is the object of the present invention to provide a synchronizing device in which the various drawbacks mentioned above are mitigated.

According to the invention there is provided a synchronizing device comprising two completely independent control circuits, the first one controlling the frequency of the local oscillator, at the frequency of which the data are received and the second one controlling the digital phase of the local clock signal, said second control circuit comprising a device detecting the transitions of bipolar data, comprising digital data integrators and supplying pulses at the zero passages of these integrators, a phase detector for comparing the phase of said pulses with the local clock pulse and supplying logical phase-correction signals and a correction device which in response to said logical phase correction signals corrects the frequency applied to said binary divider which provides the rhythm of the local clock signals.

If the frequency of the local oscillator is sufficiently stable, the synchronizing device embodying the invention is solely formed by the said second control circuit.

When the two control circuits are employed, the first one controlling the frequency of the local oscillator is simple to construct, since the phase of the oscillator of the oscillator output signal need not be accurate. The second control circuit controlling the phase of the local clock signals is constituted by digital means, thus having the advantages of this technology; i.e. few tolerance requirements in manufacture and absence of deviations in operation. The detection of the zero passages of the integrators and the subsequent digital filtering provide high insensitivity to noise. Finally synchronism between the local clock signals and the data is readily obtained with an accuracy better than 1 percent.

The following description given by way of nonlimiting example with reference to the accompanying drawings, will show how the invention may be carried into effect.

FIG. 1 is a block diagram of the synchronizing device embodying the invention, comprising two control-circuits, FIG. 2 shows time diagrams relating to the transition detection circuit.

FIG. 3*a* is a circuit diagram of an embodiment of the transition detection circuit.

FIG. 3*b* illustrates the operational periods of the two adding and subtracting counters of said circuit.

Figure 1:
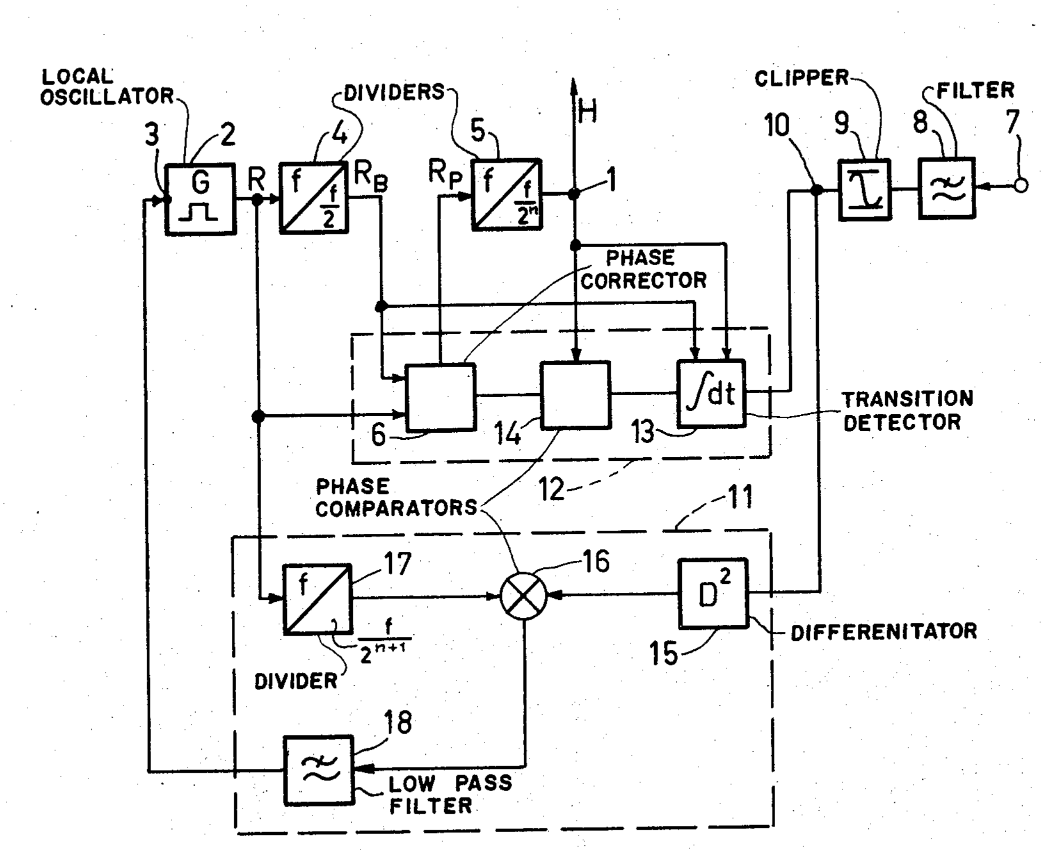
FIG. 1 shows the synchronizing device embodying the invention, which comprises a frequency control of the local oscillator as well as a phase control of the local clock signals.

The local clock signals of frequency H are supplied at 1, said frequency being obtained by dividing the high frequency R of the local oscillator 2. The local oscillator frequency may be corrected by a voltage applied to the input 3. The division of the frequency R is carried out by a binary divider formed by a first divide-by-2 circuit 4 supplying a basic rhythm $R_B$ and by a second binary divide-by-$2^n$ circuit 5, supplying at 1 the local clock signals. Between the two binary dividers 4 and 5 is connected a device 6, supplying a signal of frequency $R_p$, equal to the frequency $R_B$ in the absence of a phase-correction control. This device 6 forms the phase-correction means for the local clock signals, since a modification of the frequency $R_p$ from said device 6, subsequent to division by the divider 5, results in a modification of the phase the local clock signals of frequency H.

The data, with respect to which the phase of the local clock signal has to be adjusted, are received at 7. They are filtered by the low-pass filter 8, clipped by a device 9 and, as the case may be, shifted in voltage value in order to obtain at 10 a sequence of logical bipolar signals with steep edges representing the data. The edges of these signals will be termed hereinafter the transitions of the data.

According to the invention the synchronizing device for the local reproduction of the phase of a clock signal at 1, at the rhythm of which data are received at 7, comprises two completely independent control circuits, the first one shown at 11 controlling the frequency R of the local oscillator 2, to be in synchronism with the rhythm of the data received, the second one indicated at 12 providing a digital phase control of the local clock signal with respect to the data, said second control circuit comprising a transition detector 13 including digital data integrators supplying pulses at the zero passages of said integrators, a device 14 for comparing the phase of said pulses with the local clock signal and for filtering to produce logical phase-correction signals and finally a correction device 6 which in response to said logical phase correction signals, corrects the frequency $R_p$ applied to the binary divider 5, which provides the local clock signal of frequency H.

By way of numerical example the frequency R of the local oscillator 2 may be 23.04 MHz; the division ratio of the divider 5 may be 1/128 so that the frequency H of the local clock signal is 90 kHz.

The first control circuit 11 controlling the frequency of the local oscillator 2 is of known type and may be constructed in the manner illustrated schematically in FIG. 1. In this embodiment it comprises a differentiating circuit 15, which provides an output pulse for each transition in the data signal, a phase comparator 16, connected to the output of the circuit 15 and to the output of the binary divider 17. Binary divider 17 receives a signal of the frequency R of the local oscillator 2. The output voltage from the comparator 16 is passed through the low-pass filter 18 and then applied to the terminal 3 of the local oscillator 2, to control the frequency R thereof.

However, in accordance with one aspect of the invention this first control circuit 11 is completely separated from the second control circuit 12 for the digital phase control of the local clock signal. It can therefore be constructed in a simple manner, since there is no need for considering the phase of the frequency R supplied by the local oscillator. Moreover, if the frequency R is sufficiently stable, the first control circuit 11 may be omitted, while the second control circuit 12 for the digital phase control of the local clock signal, cooperating with the local oscillator 2 and the binary dividers 4 and 5, may constitute the synchronizing device.

A further feature of the invention resides in the means used for constructing the second control circuit 12 for the digital phase control of the local clock signal, said means comprising the devices 13, 14 and 6.

In the device 13 for transition detection the data transitions are replaced by pulses supplied at the instants of the zero passages of numerical integrators, to which the bipolar data are applied. In this way the sensitivity of noise is lower than that of devices utilizing directly the transitions for characterizing the phase of the data with respect to the local clock signal.

In the device 14 digital means are used for carrying out simultaneously a comparison of the phases of the pulses from the device 13 for transition detection and of the edges of the local clock signals and a filtering of the information resulting from said comparison so that logical phase correction signals are supplied with a given time constant. This filtering provides an increased protection against noise.

If the logical signal produced by the device 14 is representative of a required advance or delay, a binary element is subtracted from or added to the frequency $R_P$ in the correction device 6, said frequency $R_p$ being equal to the frequency $R_B$ in the absence of correction signals, so that the phase of the local clock signal of frequency H is corrected with a step depending solely upon the division ratio of divider 5. In this way synchronism between the local clock signal and the clock signal at the frequency of the data received can be achieved with high accuracy (tolerance of less than 1 percent in the embodiment in which the division ratio of the divider 5 is 1/128).

It will now be described how the devices 13, 14 and 6 of the control circuit 12 for the digital phase control of the local clock signals can be constructed in preferred embodiments of the invention.

The device 13 for the detection of the data transitions employs integrators which integrate the bipolar data subsequent to an amplitude correction, if required. Referring to the time diagrams of FIG. 2 it will be shown that the position of the zero passages of these integrators with respect to the positive and negative half periods of the local clock signal facilitates providing information about the synchronism i.e. about leading or lagging of the data in time with respect to the local clock signal.

In each one of the FIGS. *2a* to *2g* the upper diagram represents the local clock signal of frequency H, the period of which is designated by T. The second diagram shows a sequence of data D. These data are bipolar and give rise, in particular, to the transition $T_R$. The third diagram shows the output voltage of an integrator fed by the sequence of data, which are shown as analogue data in order to facilitate the explanation. The triangular waveforms in FIG. 2 do not therefore appear in the digital device according to the invention but are merely indicative of digital numbers in the system at particular instants of time.

FIG. *2a* illustrates the case in which the data are in phase with the local clock signal. The transition $T_R$ occurs at the instant $t_o$, which coincides with the edge of a clock pulse. The integrator becomes operative at the instant $t_1$, determined by the clock pulse edge preceding the instant $t_o$ by half a period of the local clock signal. The zero-setting of the integrator occurs at the instant $t_2$, determined by the clock pulse edge following the instant $t_o$ by one period of the local clock signal.

It will be apparent that in this case the zero passage of the integrator takes place at the instant $t'_o$, which coincides with another edge of the clock pulses. FIG. *2a* illustrates the case of a negative going transition $T_R$. If the transition $T_R$ is a positive-going one, the output voltage I of the integrator would have a polarity opposite the one shown in FIG. *2a*, but would pass through zero at the same instant $t'_o$.

FIGS. 2b to 2g illustrate cases in which the data are not in phase with the local clock signal. The transition $T_R$ no longer occurs at the instant $t_o$, but the start and the return-to-zero of the integrator invariably occur at the instants $t_1$ and $t_2$ as defined above.

FIG. *2b* shows that the transition $T_R$ leads with respect to $t_o$ by less than T/4. FIG. *2c* shows that it leads by T/4. From FIGS. *2a*, *2b* and *2c* it will be apparent that if the transition $T_R$ leads with respect to $t_o$ by less than T/4, the zero passage of the integrator will always occur during the positive half period of the local clock signal following the instant $t_o$. The same result will be found with a positive going transition.

FIG. 2*d* shows that the transition $T_R$ lags with respect to $t_o$ by less than T/4 and FIG. 2*e* shows that it lags by T/4. It will be apparent that, if the time lag of the transition $T_R$ with respect to $t_o$ is less than T/4, the zero passage of the integrator always occurs during the first negative half period following the instant $t_o$.

According to the invention this method of integration is utilized for characterizing a leading or a lagging shift of the data with respect to the local clock signal. If this shift is smaller than T/4, the zero passage of an integrator started at an edge of the local clock signal and reset to zero one and a half periods of the clock signal later, occurs during a positive or negative half period of said clock signal in accordance with the sense of the shift.

However, special measures have to be taken in the case in which the leading or lagging shift of the data with respect to the local clock signal is longer than T/4 (between T/4 and T/2).

FIG. 2*f* illustrates the case of a leading shift of $T_R$ with respect to the instant $t_o$ lying between T/4 and T/2. From this Figure it will be seen that the zero passage of the integrator correspond to transitions advanced by a value lying between T/4 and T/2 with respect to $t_o$ and occurring during the negative half periods of H preceding $t_o$. However, according to FIG. 4*d* a zero passage occurring during a negative half period of the clock signal also corresponds to a transition lagging by a value lying between 0 and T/4 with respect to $t_o$.

According to the invention these ambiguities are obviated by eliminating all zero passages of the integrator occurring during the negative half period of H preceding $t_o$. This may be achieved by means of the signal H', illustrated in the lower part of FIG. 2*f*. This signal H', having a period 2T, is obtained by dividing by 2 the frequency of the clock signal H. The transition detection device will supply information about the zero passage of the integrator only during the positive half periods of the signal H' covering exactly the two positive and negative half periods of H characteristic of the lead and lag of the transitions between 0 and T/4.

From FIG. 2*g* it will be seen that, if the delay of the transition $T_R$ with respect to $t_o$ lies between T/4 and T/2 no zero passage of the integrator will occur.

In order to recover information of the zero passage of the integrator in the case of a leading or a lagging time shift of between T/4 and T/2, it is sufficient to shift by half a period the clock signal H. This results, in fact, in a shift of T/2 of the integration interval $(t_1 - t_2)$ and hence in a transition advanced (or retarded) by a value lying between T/4 and T/2, which produces, after a shift of T/2 of the clock signal H, a zero passage of the integrator characteristic of a delay (or an advance) of between 0 and T/4.

Figure 2:
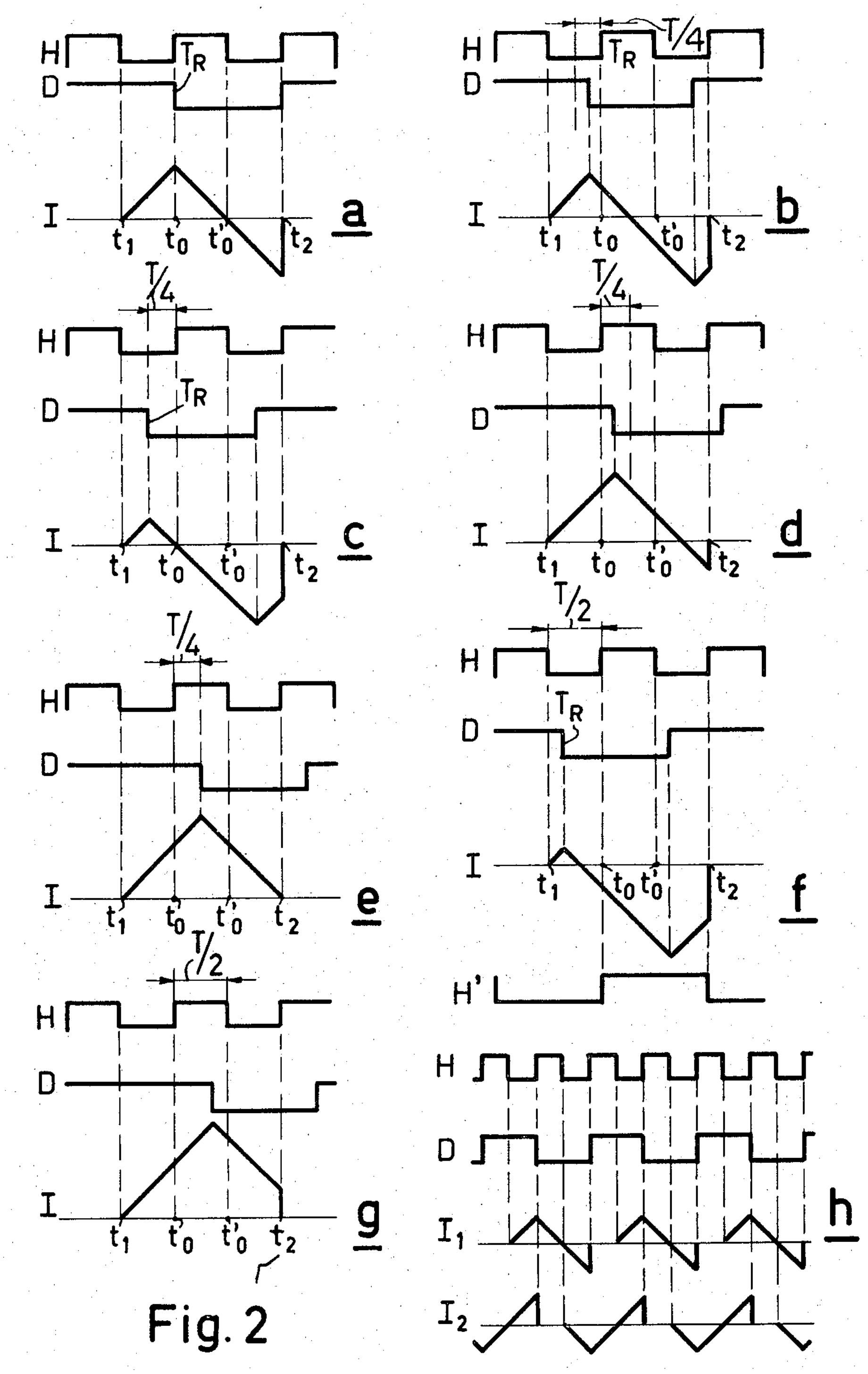
Figure 3A:
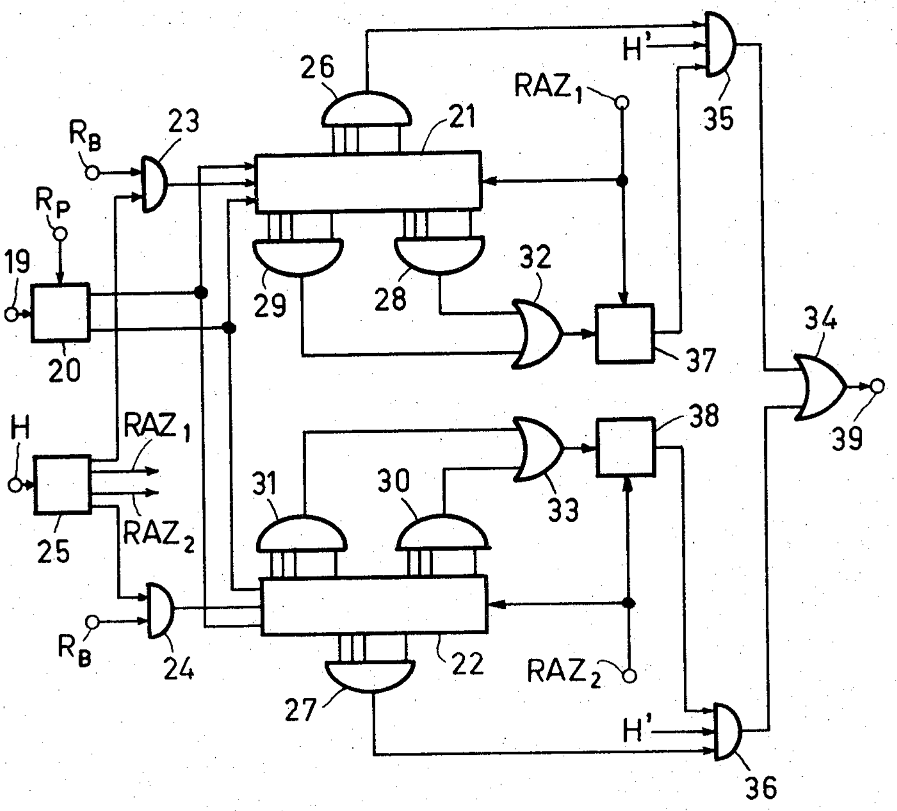

The integration method described above requires the use of two integrators, because the duration of integration required for detecting a transition is longer than the duration of a binary element of the data. One integrator detects the even-numbered transitions and a further integrator detects the odd-numbered transitions. On a different time scale than in the preceding Figure, FIG. 2h illustrates the operation of these two integrators, the output voltages of which are designated by $I_1$ and $I_2$ for a sequence of data D, for example, in phase with the local clock signal H. FIG. 3*a* illustrates the diagram of a preferred embodiment of the transition detection device 13 of FIG. 1, for carrying out the integration method described by digital means.

The integrators are formed by up-down counters driven at the frequency $R_B$ and being in the counting up or counting down state depending on whether the incoming data are positive or negative.

Connected to the terminal 19, receiving the bipolar data signal, the device shown in FIG. 3*a* comprises a polarity detection circuit 20, which controls two up-down counters 21 and 22, counting up in the event of a binary element of positive polarity or counting down in the event of a binary element of negative polarity.

The signals of frequency $R_B$ are applied to the clock inputs of these up-down counters via AND-gates 23 and 24.

By means of these two AND-gates and the circuit 25, controlled by the local clock signal of frequency H, an order of progression is successively applied to the up-down counters 21 and 22 associated with the even-numbered and odd-numbered transitions respectively.

Circuit 25 also provides the return-to-zero instructions $RAZ_1$ and $RAZ_2$ for the two up-down counters.

Figure 3B:
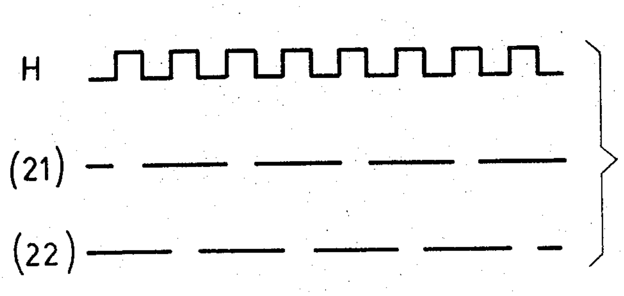

FIG. 3b illustrates at 21 and 22 the operational periods of the circuit 25 for each up-down counter 21 and 22 in co-operation with the clock frequency H. These operational periods correspond digitally to the integration periods of the two analog integrations $I_1$ and $I_2$ of FIG. 2*h*.

To the outputs of the triggers of each up-down counter there are connected three decoding circuits, one for the zero position, the two other circuits for a given threshold of up or down counting, The zero decoding circuits are designated by 26 and 27. The threshold decoding circuits are designated by 28, 29, 30 and 31.

A logical circuit comprising the OR gates 32, 33, 34, the AND gates 35 and 36 and the triggers 37 and 38 ensures that signals can be derived from the output 39 of the device only when prior to the zero passages of the two up-down counters the latter have counted up or down to an extent determined by the threshold decoding circuits.

The two triggers 37 and 38 are reset to zero at the same time as the two up-down counters 21 and 22.

Moreover, an input of the AND gates 35 and 36 receives with the appropriate phase a signal H' having a frequency equal to half the frequency of the local clock signal in order to eliminate, as set forth with reference to FIG. 2*f*, the pulses produced by the non-significant zero passages of the counters. These non-significant passages are produced by transitions leading in time by a value lying between T/4 and T/2.

Together with the logical circuit the threshold decoding circuits 28, 29, 30 and 31 facilitates eliminating the zero passages of the up-down counters due to transitions produced by stray signals of small amplitude or short duration.

At the output 39 of the transition detection device a pulse is obtained definitely at each zero passage of the up-down counters, each of which zero passages is produced by the transition of the data having an advance or a delay of a value lying between 0 and T/4.

No pulse is supplied at 39, when the the advance or the delay of the data transitions has a value lying between T/4 and T/2. If no measures were taken, such a shift would result in unstable operation of the synchronizing device, since no information would be given about the shift being leading or lagging in time and hence no phase correction instruction could be carried out.

It has been shown that for recovering information about the shifts, that is to say, about the zero passages of the up-down counters, the signal H of the local clock signal has to be shifted over half a period.

The device to be described hereinafter serves the purpose of detecting the unstable operation of the synchronizer, so that at the detection of instabilities said device applies a shift of half a period of the local clock signal of frequency H.

The concept of the device detecting the unstable operation is based on the idea that when the phase between the data and the local clock signal is correct with the transmission of a balanced code (that is to say a code in which the probability of appearance of 1 and 0 is ½) the transitions correspond to a pulse train the mean frequency of which is equal to the data transmission rate.

Consequently, in order to detect the unstable states of equilibrium two counters are used to count, on the one hand, the detected transitions and, on the other hand, a local frequency corresponding to the data transmission rate. In the event of a correct phase the counter controlled by the transitions has to operate, on the average, more rapidly than the one controlled by the local frequency. In the event of a phase giving rise to an unstable operation, the inverse applies, since the counter controlled by the transitions does not make any progress. Then a logical circuit detects this state and acts upon the local clock signal, shifting it over half a period, so that stable operation is restored.

The pulses supplied by the transition detection device 13 of FIG. 1 are employed in the device 14 of the same Figure. In this device 14 a phase comparison of these pulses with the signal of the local clock signal is carried out by means of the method described with reference to the time diagrams of FIG. 2. If the pulses occur during a positive half period of the local clock signal, the data are leading. If the pulses appear during a negative half period of the local clock signal, the data are lagging. If they appear at an edge of the local clock signal, the data are in phase. However, the information obtained about the leading or lagging is not utilized immediately. A digital filtering device permits of avoiding excessively frequent corrections of the phase of the local clock signal.

Figure 4:
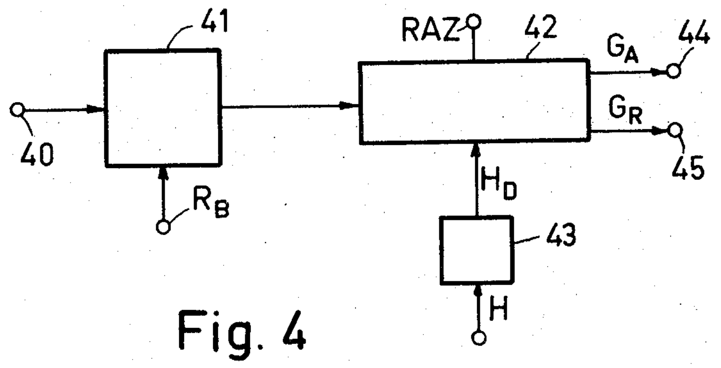
FIG. 4 is a block diagram of the phase-comparing and filtering circuit for the transitions.

FIG. 4 shows schematically the structure of the phase-comparison and filtering device.

The pulses supplied by the transition detection device are received at the terminal 40. At the reception of each of these pulses the generator 41 supplies a train of a given number of pulses, for example, 32 pulses. This train of pulses is applied to an up-down counter 42, which is in the up or down counting state in accordance with the value of a signal $H_D$, supplied by the phase-shifting circuit 43. The signal $H_D$ is the signal H of the local clock signal advanced with respect to the signal H by half the duration of the train of pulses.

Thus, when the data are in phase with the local clock signal and hence the train of pulses starts on a flank of the signal H, the first half of pulses of the train is counted, for instance, up to the next flank of the signal $H_D$, after which the second half of the pulses of the train is counted down. Consequently, under this condition of a correct phase, the up-down counter 42 does not make any progress.

On the contrary, if the data appear early or late with respect to the local clock signal, the up-down counter 42 will count up or down.

However, only when this counter 42 has attained a given threshold of count-up or count-down subsequent to a sequence of transitions, the outputs 44 and 45 will provide the signals $C_A$ and $C_R$, instructing a correction of the early or late appearance dealt with in the correction device. The device shown in FIG. 4 thus performs a filtering function, since at any instant it supplies a mean value of phase-shift between the data and the local clock signal. The correction control signals are only supplied, when this mean value attains a given threshold.

The return-to-zero signal RAZ of the counter 42 is supplied by the correction device, when the correction instructions have been carried out.

The correction device 6 of FIG. 1 is controlled by the phase-comparing and filtering device 14 of the same Figure. This correction circuit serves to add or to subtract a binary element to or from the frequency $R_P$, which it supplies at the reception of an advancing or delaying instruction. Thus, after division by the divider 5 by 128, for instance, the phase of the local clock signal is modified by a step equal, in this example, to 1/128 of the duration of a binary element of the data.

Figure 5:
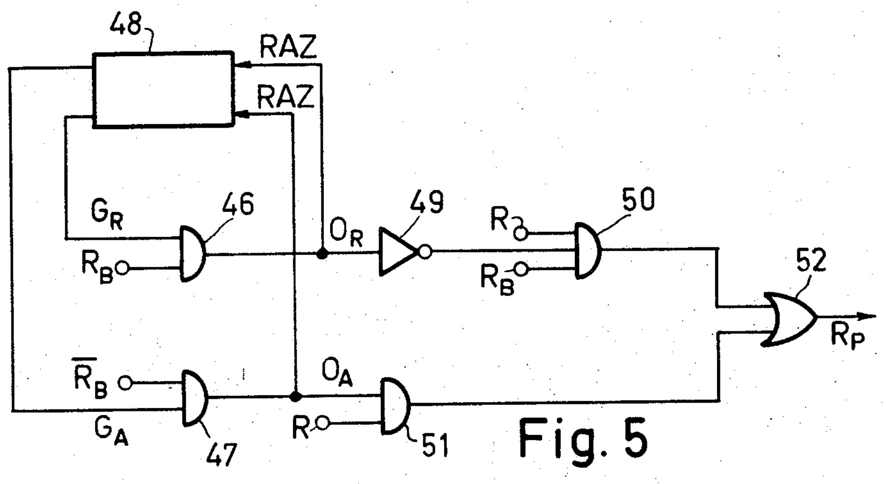
FIG. 5 illustrates the diagram of the logical arrangement of the correction device.
Figure 6:
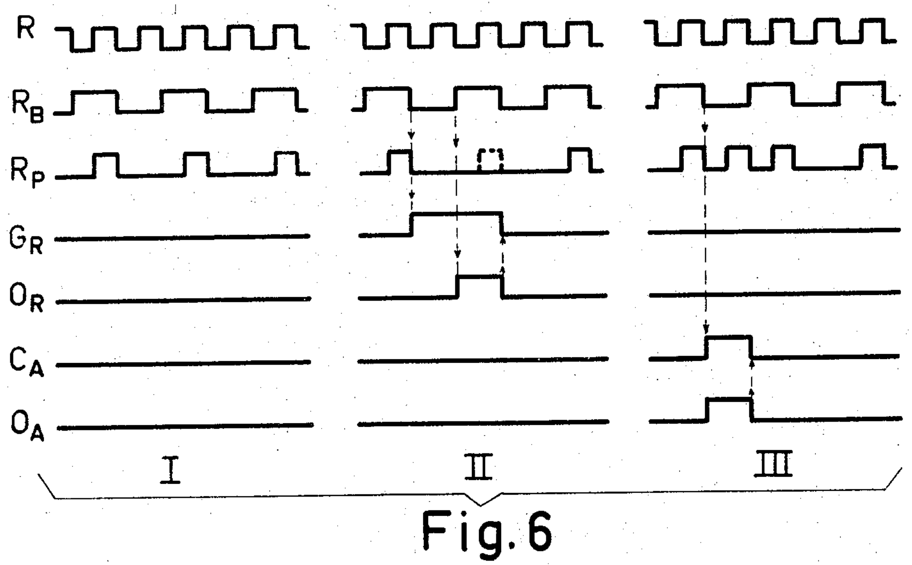
FIG. 6 illustrates time diagrams relating to the correction device.

FIG. 5 illustrates the logical arrangement of the correction device. FIG. 6 illustrates the input signals and the output signals of the circuit shown in FIG. 5.

The correction circuit comprises the AND-gates 46 and 47, controlled by the signals $C_R$, $R_B$ and $C_A$, $\overline{R_B}$, respectively; $C_R$ and $C_A$ are the advance and delay control-signals processed by the phase-comparison and filtering circuits for the transitions. For a better understanding of the operation of the correction device FIG. 2 shows at 48 an up-down counter of the circuit comparing the phase of filtering the transitions. This counter supplies the signals $C_A$ or $C_R$, when a given counting threshold is attained. The other control-signal of the AND-gates 46 and 47 has the basic frequency $R_B$, which is equal to half the frequency R provided by the pilot oscillator.

These two AND gates 46 and 47 supply the signals $O_R$ and $O_A$ respectively.

The correction circuit comprises furthermore a logical unit formed by the invertor 49 and AND gates 50 and 51 of the OR gate 52. Under the control of the signals $O_R$ and $O_A$ the arrangement supplies the output signal of the correction circuit having the frequency $R_P$, whose logical function is: $\overline{O_R} \cdot R \cdot R_B + O_A \cdot R$.

Moreover, by means of the signals $O_A$ and $O_R$ a return-to-zero signal RAZ for up-down counter 48 is produced. This return-to-zero signal is produced after the correction of the frequency $R_P$ in response to the signals $O_R$ or $O_A$ and it cancels the advance- or delay- control signals $C_R$ or $C_A$.

The part I of FIG. 6 is a time diagram of the various signals in the absence of a delaying or advancing instruction. Thus $C_R = 0$, $C_A = 0$ and hence $O_R = 0$, $O_A = 0$. The logical function of $R_P$ thus becomes: $R \cdot R_B$, as illustrated in part I of FIG. 3. In this case the frequency $R_P$ is equal to the frequency $R_B$.

Part II of FIG. 3 shows the time diagrams in the presence of a delaying instruction. This instruction is formed by a signal $C_R = 1$ appearing on a descending flank of $R_B$. Due to the AND gate 46, this delay instruction will provide a signal $O_R = 1$ only when $R_B = 1$. $O_R$ = 1 as long as $R_B = 1$. In accordance with the logical function of $R_P$, $O_R = 1$ and $O_A = 0$ involves that $R_P = 0$, which is illustrated in part II of FIG. 3 by the suppression of the element of the signal $R_P$ drawn as a dotted line.

When subsequently $R_B = O$, $O_R = O$ and the descending flank of the signal $O_R$ supplies a signal RAZ, which resets to zero the trigger of the counter 48. This return-to-zero cancels the delay instruction $C_R$ and drops to the zero value.

Part III of FIG. 3 shows the time diagram in the presence of an advance instruction. This advance instruction is formed by a signal $C_A = 1$, appearing on the descending flank of $R_B$. With $C_A = 1$ and $R_B = 0$, gate 47 supplies a signal $O_A = 1$. In accordance with the logical function of $R_P$, $O_A = 1$ and $O_R = 0$ involves that $R_P = R$, which is illustrated in FIG. 3 (part III) by the addition of an element to the signal $R_P$. When subsequently $R_B = 1$, $O_A = 0$ and the descending flank of the signal $O_A$ supplies a signal RAZ, which resets to zero the counter 48. This return-to-zero cancels the advance instruction $C_A$ and $C_A$ thus drops to zero value.

The synchronizing device in accordance with the invention may be employed at the receiver end of data transmission systems.

What is claimed is:

1. A device for synchronizing a clock signal with the phase of a received data signal, comprising a local oscillator means for providing a pulsed signal having a frequency equal to a multiple of the clock signal, a binary frequency divider, means connecting the local oscillator to the binary frequency divider, the frequency divider thereby providing said clock signals, and a phase control signal comprising a digital integrator for integrating the received data signal, transition detecting means for sensing the number zero in the integrator and for providing an indicating pulse each time the integrator passes through the number zero, comparator means for providing a phase difference signal corresponding to the difference in phase between the indicating pulses and the clock signal, the means connecting the local oscillator to the frequency divider comprising a phase correction means for adding and subtracting pulses to the local oscillator signal in response to the phase difference signal.

2. A synchronizing device as claimed in claim 1, characterized in that the transition detection means comprises two up-down counters driven at a frequency equal to half the local oscillator frequency, a data polarity detection circuit, a starting and return-to-zero circuit for the two up-down counters, controlled by the local clock signal, said circuits being arranged to enable the up-down counters to count up or down in dependence upon the polarity of the data, and during a period of time equal to one and a half periods of the local clock signal, the starting instants of one up-down counter being shifted relative to the other over one period of the local clock signal, the two up-down counters being furthermore provided each with three decoding circuits, one for zero, the two others for a threshold of up-count and a threshold of down-count respectively, and a logical assembly controlled by the output signals of the decoding circuits for supplying at the output of the transition detection device, pulses at the zero passages of the up-down counters in response to zero passages preceded by a transgression of either the one or the other of said thresholds.

3. A synchronizing device as claimed in claim 2 further comprising means for providing a control signal having a frequency equal to half the clock frequency to the logical assembly of the transition detection device for eliminating the pulses produced by the zero passages of the up-down counters during the half period of the local clock signal following the instant of starting of the up-down counter.

4. A synchronizing device as claimed in claim 1 characterized in that it comprises a device for detecting unstable operation, including a first counter controlled by the indicating pulses, a second counter controlled by a local rhythm corresponding to the transmission rate of the received data signal and a logical circuit inverting the phase of the local clock signal when the first counter steps on less rapidly than the second counter.

5. A synchronizing device as claimed in claim 1 characterized in that the device for comparing the phase and filtering the transitions comprises a pulse train generator supplying a pulse train at each detected transition, and an up-down counter driven by the output pulses of said generator and controlled to count up or down in dependence upon the polarity of the signals obtained by a shift of the local clock signals equal to half the duration of the pulse train, said up-down counter supplying at two outputs logical signals which control the correction device when attaining either the one or the other of said threshold counts.

6. A synchronizing device as claimed in claim 1 characterized in that the correction device is formed by a logical circuit controlled by the logical phase-correction signals supplied by the up-down counter of the phase comparison and filtering device comparing the phase and filtering the transitions so that a binary element is added to or subtracted from the signal applied to the binary divider which supplies the local clock signal, said up-down counter being reset to zero when the phase correction is carried out.

7. A device for synchronizing a clock signal with the phase and the frequency of a received data signal, comprising a local oscillator means for providing a pulsed signal having a frequency equal to the multiple of the clock signal, a binary frequency divider, means connecting the local oscillator to the frequency divider, the frequency divider thereby providing said clock signals, frequency adjusting means connected to said local oscillator for detecting frequency differences between the clock signal and the received data signals and for providing a control signal to the local oscillator for synchronizing the frequency of the local oscillator with the frequency of the received data signal and a phase control circuit operating independently of the frequency adjusting means and comprising a digital integrator for integrating the received data signals, transition detecting means for sensing the number zero in the integrators and for providing an indicating pulse each time the integrator passes through the number zero, comparator means for providing a phase difference signal corresponding to the difference in phase between the indicating pulses and the clock signal, the means connecting the local oscillator to the frequency divider comprising phase correction means for adding and subtracting pulses to the local oscillator signal in response to the phase difference signal.

* * * * *